United States Patent [19]

Morikawa et al.

[11] Patent Number: 5,626,937
[45] Date of Patent: *May 6, 1997

[54] COMPOSITE CARDS

[75] Inventors: Masaki Morikawa; Naoyuki Hosoda; Naoki Uchiyama, all of Sanda, Japan

[73] Assignee: Mitsubishi Materials Corporation, Tokyo, Japan

[*] Notice: The portion of the term of this patent subsequent to Jun. 9, 2009, has been disclaimed.

[21] Appl. No.: 260,404

[22] Filed: Jun. 14, 1994

Related U.S. Application Data

[60] Continuation of Ser. No. 863,754, Apr. 6, 1992, Pat. No. 5,364,482, which is a division of Ser. No. 614,116, Nov. 16, 1990, Pat. No. 5,120,589, which is a continuation-in-part of Ser. No. 536,996, Jun. 13, 1990, abandoned, which is a continuation of Ser. No. 219,263, Jul. 15, 1988, abandoned.

[30] Foreign Application Priority Data

| Feb. 10, 1988 | [JP] | Japan | 63-29118 |
| Mar. 1, 1988 | [JP] | Japan | 63-27298 |
| Mar. 1, 1988 | [JP] | Japan | 63-27299 |
| Apr. 13, 1988 | [JP] | Japan | 63-91069 |
| Apr. 14, 1988 | [JP] | Japan | 63-92315 |
| Apr. 28, 1988 | [JP] | Japan | 63-106710 |
| Apr. 28, 1988 | [JP] | Japan | 63-106711 |
| Apr. 28, 1988 | [JP] | Japan | 63-106712 |

[51] Int. Cl.$^6$ .................. B32B 1/04; B32B 3/02
[52] U.S. Cl. .................. 428/76; 40/323; 40/661; 428/13; 428/68; 428/187; 428/205; 428/209; 428/332; 428/457; 428/463
[58] Field of Search .................. 428/13, 68, 76, 428/187, 205, 209, 332, 457, 463; 40/323, 661

[56] References Cited

U.S. PATENT DOCUMENTS

| 1,977,960 | 10/1934 | Weinde | 428/187 |
| 2,506,165 | 5/1950 | Mountcastle | 427/272 |
| 2,998,126 | 8/1961 | Jenkins | 428/13 |
| 3,089,800 | 5/1963 | Colfer | 428/40 |
| 3,522,673 | 8/1970 | Dudley | 428/13 |
| 4,648,189 | 3/1987 | Michel | 40/546 |
| 4,698,032 | 10/1987 | Shoher | 440/6 |
| 4,940,637 | 7/1990 | Shoher | 428/607 |
| 5,120,589 | 6/1992 | Morikawa | 428/76 |

FOREIGN PATENT DOCUMENTS

| 0330726 | 9/1989 | European Pat. Off. . |
| 330726 | 9/1989 | European Pat. Off. . |
| 2737164 | 2/1979 | Germany . |
| 8023200 | 2/1981 | Germany . |
| 8236376 | 11/1983 | Germany . |
| 48-51297 | 3/1973 | Japan . |
| 48-51297 | 7/1973 | Japan . |
| 50-66993 | 6/1975 | Japan . |
| 5284472 | 12/1975 | Japan . |
| 51-20587 | 2/1976 | Japan . |
| 51-127172 | 11/1976 | Japan . |
| 52-86481 | 7/1977 | Japan . |
| 52-117995 | 9/1977 | Japan . |
| 52-140994 | 11/1977 | Japan . |
| 54-96599 | 7/1979 | Japan . |
| 56-120395 | 9/1981 | Japan . |
| 57-125097 | 8/1982 | Japan . |
| 57-55103 | 11/1982 | Japan . |
| 59-64272 | 4/1984 | Japan . |
| 59-57869 | 10/1984 | Japan . |
| 62-196195 | 8/1987 | Japan . |

(List continued on next page.)

*Primary Examiner*—Nasser Ahmad
*Attorney, Agent, or Firm*—Cushman, Darby & Cushman IP Group of Pillsbury Madison & Sutro LLP

[57] ABSTRACT

A precious metal foil composite comprising a precious metal foil encased, by lamination, in a transparent polymeric sheet material. The composite cards produced from this composite material are used for practical purposes by encasing the above composite together with another component having opaque decorative patterns, and finally encasing the entire assembly in a secondary hard protective covering to provide the outermost protection.

7 Claims, 5 Drawing Sheets

U.S. PATENT DOCUMENTS

| | | |
|---|---|---|
| 63-199690 | 8/1988 | Japan . |
| 63-154219 | 10/1988 | Japan . |
| 64-50927 | 3/1989 | Japan . |
| 1184286 | 7/1989 | Japan . |
| 1204800 | 8/1989 | Japan . |
| 1131600 | 9/1989 | Japan . |
| 1263933 | 10/1989 | Japan . |
| 1263042 | 10/1989 | Japan . |
| 1275133 | 11/1989 | Japan . |
| 1275132 | 11/1989 | Japan . |
| 1275131 | 11/1989 | Japan . |
| 229327 | 1/1990 | Japan . |
| 2068295 | 8/1981 | United Kingdom . |

COMPOSITE CARDS

This is a continuation of application Ser. No. 07/863,754, filed Apr. 6, 1992, now U.S. Pat. No. 5,364,482 which was a divisional of Ser. No. 07/614,116 filed Nov. 16, 1990, now U.S. Pat. No. 5,120,589, which was a CIP of Ser. No. 07/536,996 filed Jun. 13, 1990 now abandoned, which was a continuation of Ser. No. 07/219,263 filed Jul. 15, 1988 now abandoned.

FIELD OF THE INVENTION

The present invention relates to a composite card, which is attractive, valuable and convenient as gifts and souvenirs; furthermore, said composite card has considerable appeal as decorative gifts, because said card is made from one of a groups of precious metals consisting of gold, silver or platinum and the like.

BACKGROUND ART

Reproduction of impressions by means of stamping with metal dies equipped with suitable impressions, or embossing, has been widely practised for gold coins and commemorative medals.

In recent years, the public has shown interest in purchasing gram-quantities of gold, which created a new market in precious metal gifts and souvenirs. However, the traditional embossing techniques applicable to coins and medals are not suitable for thin strip or sheet materials, typical of the new market, and the products produced by such techniques generally lacked aesthetic appeal as gifts and souvenirs.

Therefore, it would be of great interest to be able to emboss by roll forming appropriate impressions on the surface of thinly-rolled strip materials. For example, a one gram piece of gold can be rolled into an attractive foil material of 20 micrometers thickness which is a candidate material for such roll-embossing operations.

However, such embossing/marking operations are difficult to perform on such thin materials, because they lack mechanical strength, and easily suffer from mechanical damages during production and handling operations.

Furthermore, gifts and medallions are usually custom made for a large number of small-lot customers, and the high cost of metal dies makes it uneconomical to produce such items by roll-embossing.

In such instances, a composite material, consisting of a precious metal foil backing and a separate transparent acrylic plate having suitable preset patterns or designs, may provide an attractive alternative production method to roll-forming or stamping operations.

In this case, the precious metal foil can be mass produced while various decorative plate having preset custom markings can be produced in small lot quantities. The difficulties of handling thin foil materials remain as well as the difficulties associated with processing a composite assembly, however.

SUMMARY OF THE INVENTION

This invention relates to a decorative precious metal composite card; which can be manufactured from a small quantity of precious metals; which are not susceptible to manufacturing damages; and which permits economical production of a large variety of small lot quantities.

According to this invention, a composite core material is made by laminating transparent protective layers of polymeric material on both sides of a plain metal foil material made from a group of precious metals consisting of unalloyed and alloyed precious metals.

The above composite core material is assembled to another transparent sheet material with opaque markings, said sheet material, hereinafter referred to as a decorative component, having mostly transparent areas and suitably marked opaque regions. Said assembled material is further encased in a transparent polymeric material to provide overall protection on both sides of the said composite, thereby producing durable, attractive precious metal composite cards suitable for gifts and souvenirs.

DETAILED DESCRIPTION OF THE PREFERRED EMBODIMENTS OF THE PRESENT INVENTION

Figure 1:
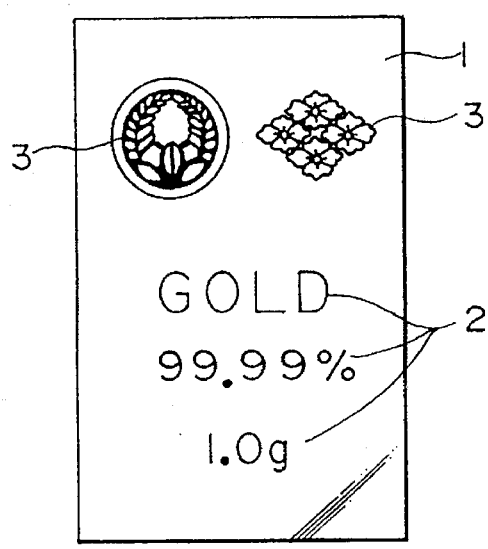
FIG. 1 is a schematic plan view of a composite card described in a first preferred embodiment of the present invention.
Figure 2:
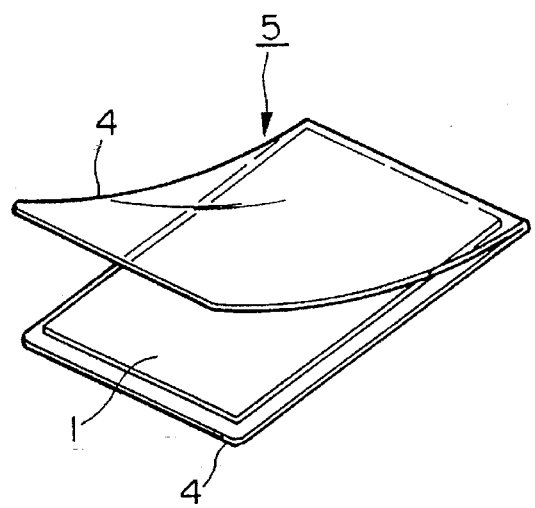
FIG. 2 is an oblique view of a precious metal foil laminated with a primary protective covering.
Figure 3:
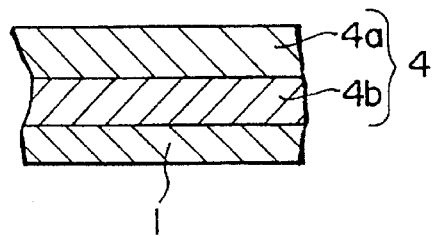
FIG. 3 is a schematic sectional view of the composite core material.

FIGS. 1 to 3 relate to a first preferred embodiment of this invention. A thin gold foil material shown in this preferred embodiment was made from a 99.999% pure gold ingot by repeated rolling operations to produce foil materials of about 0.005 mm to 0.3 mm thickness. Said foil material was later cut into a suitably sized rectangular pieces.

The weight and purity information were engraved on the surface of the gold foil by a YAG laser, in this preferred embodiment, which created a series of fine grooves having a depth of approximately 1/10 of the thickness of the metal foil.

The information, engraved on the metal foil at the conclusion of the foil rolling operation, was for indicating the quality of the metal foil material, including such information as the trade mark of a supplier of the precious metal, and were not for the purpose of showing information requested by the customer.

It should be noted that the shape of the composite core material is not restricted to rectangles only, nor is the material of construction limited to gold; silver, platinum and the like are also applicable.

As shown in FIG. 2, said foil material 1 was laminated with transparent polymeric sheet materials, having a size slightly larger than the foil material 1 itself (in this case about 1 mm larger in all directions). This laminated covering was denoted as the primary protective covering 4. When the edges of the sheet material were sealed, the metal foil became laminated inside the envelope, thereby producing a composite core 5. The primary protective covering 4 was, in fact, composed of a double layer, as shown in FIG. 3. The outer layer 4a, of 100 micrometer thickness, was made from a PET (polyethylene telephthalate) which is mechanically strong. The inner layer 4b, of 50 micrometer thickness, was made from an ionomer resin (Trade Name Surlyn, manufactured and sold by Du Pont) which can be applied at relatively low temperatures. By utilizing a polymer of a relatively low softening temperature for the inside lamination of a double lamination procedure, it was possible to prevent overall distortion of the primary protective covering 4 during the laminating operation.

The composite core 5 thus formed was both durable and easy to handle, even though the foil material, formed from a small lump of gold weighing only about several grams, itself was fragile. The composite core was visually attractive because of its relatively large area and was suitable for quality gifts and souvenirs.

Figure 4:
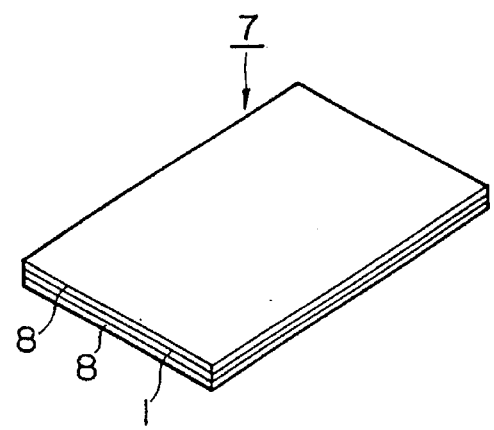
FIG. 4 is an oblique view of a second preferred embodiment of the composite card.

FIG. 4 shows a second preferred embodiment of this invention. A composite core strip 7 shown here had basically the same double layer construction of the primary protective covering 8 as was shown in the first preferred embodiment, consisting of a central metal foil laminated with transparent polymeric materials having the same size and area measurements. Such a composite core strip 7 has an additional advantage that it can be mass produced while providing the same degree of protection as the composite core 5 shown in the first preferred embodiment, above.

Figure 5:
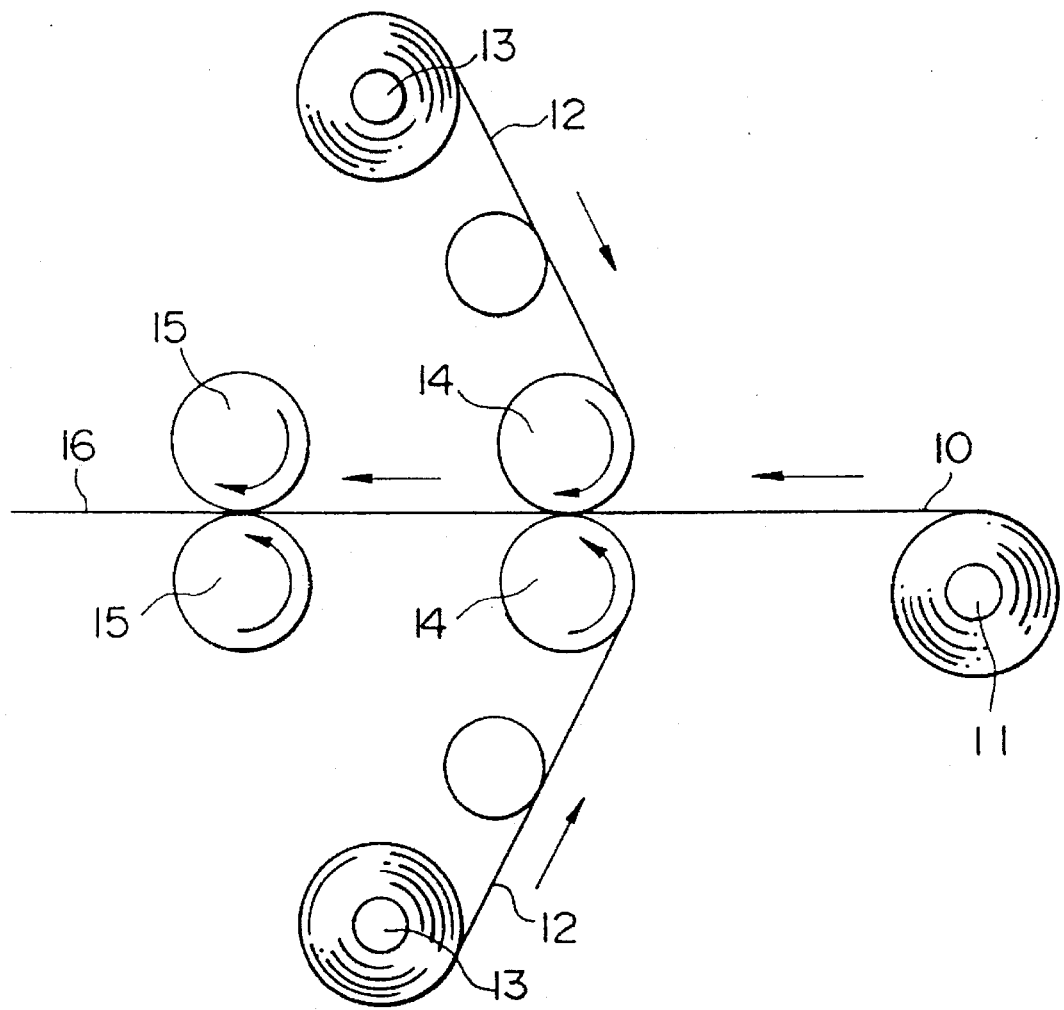
FIG. 5 provides explanations of composite card manufacturing steps.

A method of mass producing such a composite core strip 7 is explained with reference to FIG. 5. A metal foil strip 10 (of 15 micrometer thickness) was taken off a roll 11 to be laminated with a double-layer polymer strip 12, consisting of a PET and a Surlyn, wound on a spool 13. The two materials, metal foil strip 10 and a polymer strip 12 were thermally bonded in a pair of pressing rolls 15 subsequent to passing through a preheater rolls 14, so as to form a triple-layered composite core strip material 16. A large quantity of said composite core strip 7 was produced by stamping out the required area in succession from a center section of the composite strip 7. The clean edges of this type of composite core are advantageous when laminated with transparent outer protectors, as will be explained later. The laminates were not susceptible to delamination because of the sealing provided by Surlyn.

Figure 6:
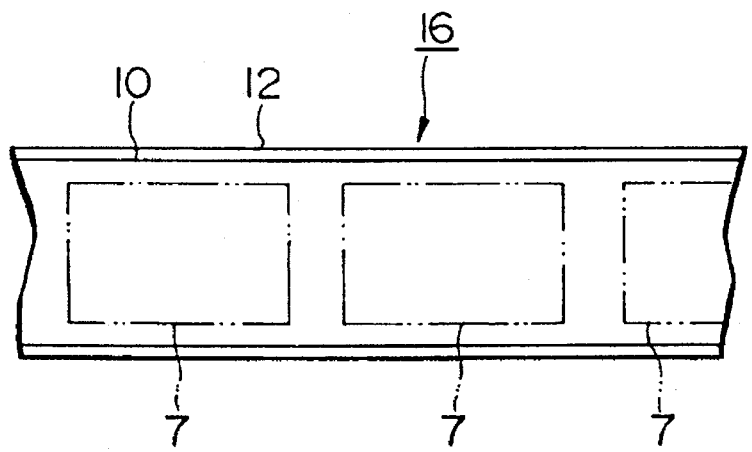
FIG. 6 is a plan view of a strip of said cards.
Figure 7:
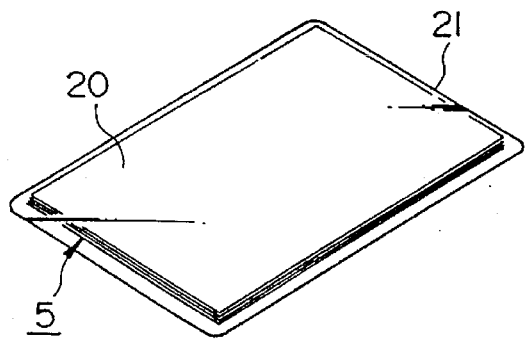
FIG. 7 is an oblique view of a third preferred embodiment of composite material.
Figure 9:
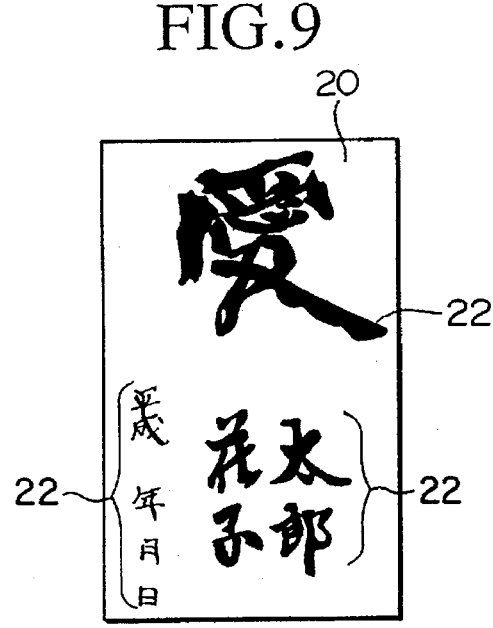
FIG. 9 is a plan view of a decorative component.
Figure 8:
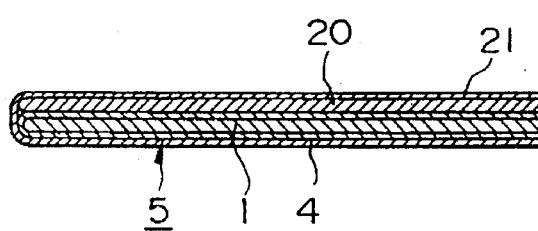
FIG. 8 is a sectional view of above embodiment.

The preferred embodiments described above are intended primarily to provide transparent blank materials for manufacturing of composite cards in conjunction with decorative components. However, the core materials can also be used for decorative purposes by embossing directly on the protective surfaces. The markings can be placed on such cards in the same way as in the case of separate protective coverings, but the durability is better if the markings are placed on the inside surface of the outer laminate. To place markings on the card shown in the preferred embodiment in FIG. 4, it would be convenient to place regularly spaced markings on the polymer strip 12, shown in FIG. 5, to guide separation into individual cards along the markings, such as those shown in FIG. 6.

A third preferred embodiment is shown in FIGS. 7 to 10. The pictorial composite cards shown in these figures were produced by combining transparent decorative component 20 (to be explained next) with said composite core 5 (a material having no or very little decorative character), and encasing the whole combination in a secondary protective covering 21.

Said decorative component 20 comprises opaque pictorial design element 22 (hereinafter referred to as pictorial element 22), superimposed on a transparent plate made of such plastic materials as acrylic and glass. The material of construction of decorative component 20 need not necessarily be a stiff material, but softness and thickness can be adjusted according to applications. The pictorial patterns can be placed on the decorative component 20 by any suitable means or combination of means, such as painting, engraving and etching, and the like. The opaque parts can serve either as a pictorial element 22 or as a background element. The pictorial portions can be cut out also to expose the metal background. The contents of the pictorial element 22 to be placed on the decorative component 20 are not limited. For wedding announcements, for example, the names to be shown may vary from case to case, but in other applications such as business cards, commemorative medals, and reproductions of famous art and designs, repetitive patterns may be required. Other reproductive techniques, such as photocopying, thermal printing, laser copying and photo-reproduction, are also applicable techniques.

Figure 10:
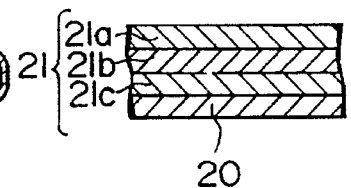
FIG. 10 is a sectional view of a second protective covering on said composite card.

As shown in FIG. 10, the secondary protective covering 21 comprised a triple structure: an outermost layer 21a, of 10 micrometer thickness, which was made of acrylic to utilize its high surface hardness; a middle layer 21b, of 50 micrometer thickness, which was made of a thermoplastic, PET, to utilize its mechanical strength; and the inside layer 21c, of 50 micrometer thickness, which was made of a thermoplastic resin, Surlyn, to enable bonding of the composite core 5 to said transparent decorative component 20 at relatively low temperatures. The triple structure of said secondary protective covering permits distortion-free bonding of the protective layer on the composite core 5 and permits production of durable, attractive cards made possible by a long term protection of the surfaces by durable transparent acrylic covering.

The composite core 5 is protected from bending and other damages which may occur during handling and transportation, because of the reinforcing action of the decorative component 20; therefore, this production technique minimizes the occurrence of losses due to damaged goods. Furthermore, the composite core 5 is further protected and secured by the secondary laminations 21, thus providing additional means for preserving the original appearance of the composite card by preventing relative shifting of the precious metal foil 1 with respect to the decorative component 20, and by preventing wrinkling of the foil and other mechanical damages as well as soiling of the surfaces. The superior appearance of the composite card is a further result of the fact that, because the metal foil 1 is protected with the primary protective covering 4, light is diffracted at the interfaces, thereby eliminating the transparency of the foil material 1 and providing an appearance and a color tone of the solid precious metal. For the same reasons, the pictorial elements 22 on the decorative component 20 do not appear transparent.

The third preferred embodiment described a case of superimposing decorative component 20 on top of the composite core 5, but it should be noted that volume production of composite cards is possible by utilizing the decorative component 20 with the thin composite core strip 7 cited in the second preferred embodiment above.

Figure 11:
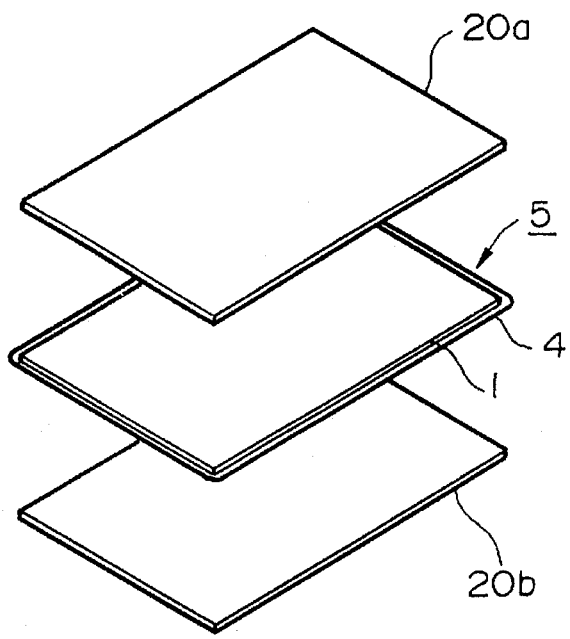
FIG. 11 is an oblique view of a fourth preferred embodiment of the composite card.
Figure 12:
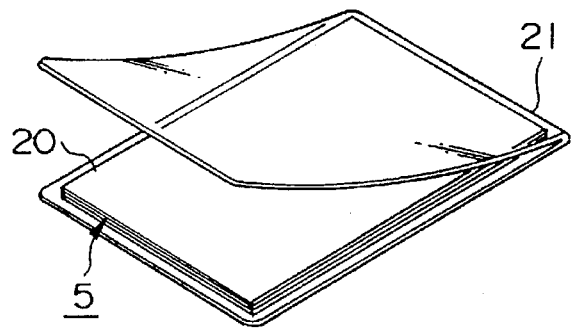
FIG. 12 is a view of an assembled sample.
Figure 13:
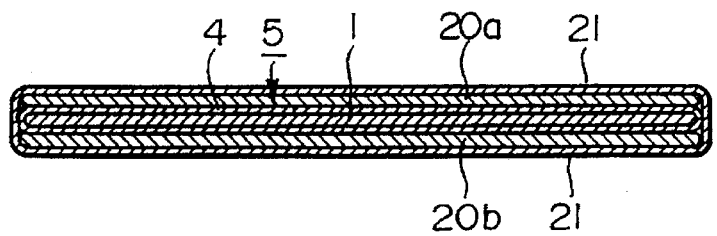
FIG. 13 is a sectional view of above embodiment.

The fourth preferred embodiment of the preferred embodiments is shown in FIGS. 11 and 12. This is a case in which the composite core 5 was contained in a pair of transparent decorative plates 20a and 20b, and which assembly was then encased in the secondary protective covering 21.

The information to be exhibited was placed on the decorative plates 20a and 20b, and there was little need for using the composite core 5 for this purpose. The materials of construction of 20a and 20b can be the same as described previously.

The example above is particularly useful in cases wherein the precious metal foil 1 is made of a very thin foil material.

In the third and fourth preferred embodiments described above, the core components, the composite core 5 and composite core strip 7, can be reused repeatedly, in combination with new decorative components having different patterns and designs, thus permitting economical productions of a variety of small volume custom products. The precious metal core can be made convertible to currency by declaring appropriate information, such as a trade mark and purity to indicate the quality of the core, on the foil itself.

Figure 14:
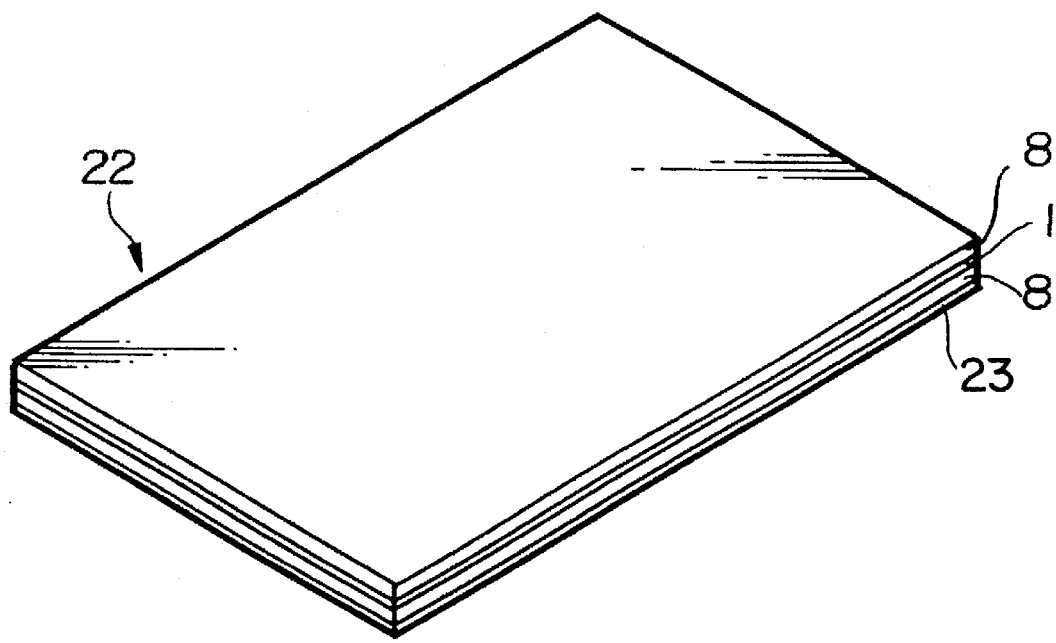
FIG. 14 is an oblique view of a magnetic composite card.

A fifth preferred embodiment is shown in FIG. 14, an example of a card which serves decorative and functional purposes. Said card comprises opaque pictorial element 22 (described in the preferred embodiment 2) and a magnetic layer 23, having a magnetic layer of thickness of about 4 to 6 micrometer made of a magnetic material, such as ferrites. These cards are useful for the production of prepaid cards and other portable cards for identification purposes. In these cases, it is desirable to place the information on the primary covering 8.

Figure 15:
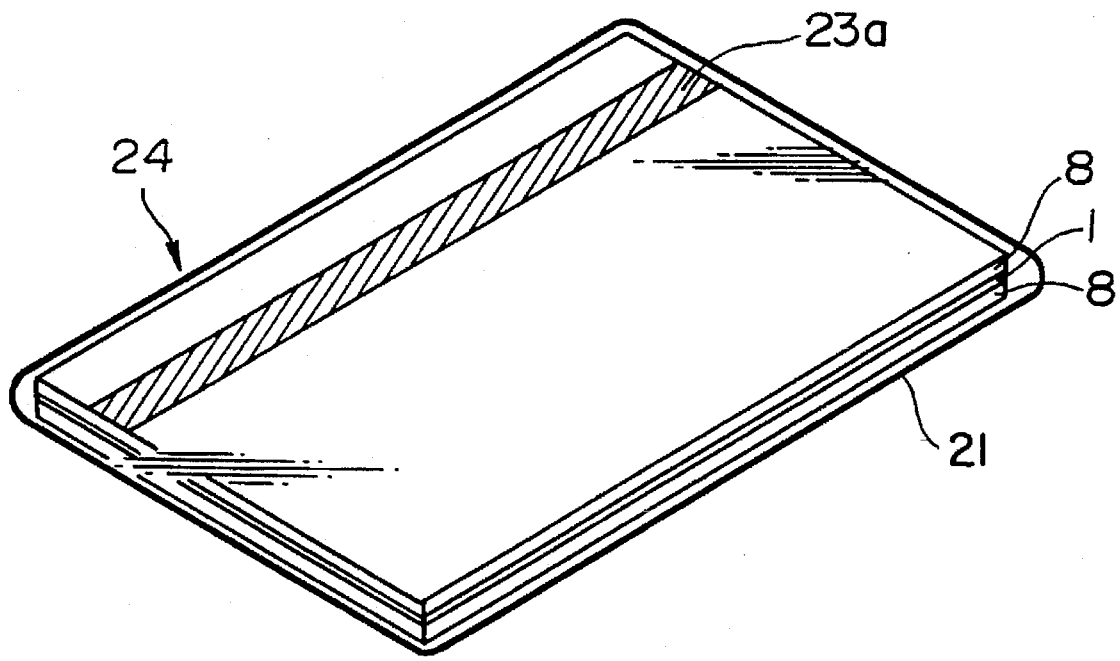
FIG. 15 is an oblique view of a magnetic tape composite card.

A sixth preferred embodiment shown in FIG. 15 describes an application of a composite card case cited in the third preferred embodiment in combination with a magnetic tape 23a. This type of cards 24 is useful for the production of cash cards and other banking cards.

We claim:

1. A precious metal composite comprising:

a precious metal member defining a substantially planar plate element having first and second planar surfaces and an outer periphery;

a first plate element having a pictorial pattern on a surface thereof mounted in side-by-side, parallel-facing relation to said first planar surface; and a cover element made from a polymeric material encapsulating the combination of said first plate element and said substantially planar plate element;

wherein said outer periphery of said substantially planar plate element is surrounded by said cover element.

2. A precious metal composite as in claim 1, further comprising a second plate element having a pictorial pattern on at least one surface thereof, said second plate element being mounted in side-by-side, parallel-facing relation to said second planar surface, the combination of said first and second plate elements and said substantially planar plate element being encapsulated in said cover element.

3. A precious metal composite as in claim 1, wherein said first plate element is of a size and shape substantially equal to a size and shape of said substantially planar element.

4. A precious metal composite as in claim 1, wherein said first plate element is transparent and at least a portion of said pictorial pattern is opaque.

5. A precious metal composite as in claim 1, wherein said first plate element is formed from acrylic.

6. A precious metal composite as in claim 1, wherein said metal element is formed from a metal selected from the group consisting of gold, silver, platinum, and gold alloys.

7. A precious metal composite as in claim 1, wherein the combination of said first plate element and said substantially planar element are laminated between two sheets of polymeric material.

* * * * *